(12) United States Patent
Bryant et al.

(10) Patent No.: US 6,650,468 B1
(45) Date of Patent: Nov. 18, 2003

(54) OPTICAL AMPLIFIER ARRANGEMENT

(75) Inventors: Andrew J Bryant, Bishops Stortford (GB); Mark A Gibbon, London (GB); Paul A Bruce, Bishops Stortford (GB); Martin Agnew, Mountfitchet (GB)

(73) Assignee: Nortel Networks Limited, St. Laurent (CA)

( * ) Notice: Subject to any disclaimer, the term of this patent is extended or adjusted under 35 U.S.C. 154(b) by 75 days.

(21) Appl. No.: 10/007,395

(22) Filed: Oct. 26, 2001

(51) Int. Cl.⁷ .................................................. H01S 3/00
(52) U.S. Cl. ...................................................... 359/349
(58) Field of Search ................................ 359/349, 124, 359/174

(56) References Cited

U.S. PATENT DOCUMENTS 6,154,583 A * 11/2000 Kuroyanagi et al. .......... 385/16
6,510,261 B2 * 1/2003 Sorin et al. .................... 385/27

* cited by examiner

*Primary Examiner*—Mark Hellner
(74) *Attorney, Agent, or Firm*—Barnes & Thornburg

(57) ABSTRACT

An optical amplifier arrangement comprises a splitter for providing an input WDM optical signal on at least first and second output paths. An optical amplifier is provided in at least one of the paths, and a signal routing arrangement is provided for routing individual channels or groups of channels of the WDM signal within the at least one of the paths. A switch selects the signal from one of the at least first and second output paths. In this arrangement, there are two paths between the input and output. Whilst one path is being used, the components in the other path can be upgraded. For example, a switching arrangement may be provided in the other path, and an amplifier may also be upgraded, without disrupting service in the path in use. This enables an amplifying node within an optical communications system to be incrementally upgraded.

19 Claims, 16 Drawing Sheets

US 6,650,468 B1

OPTICAL AMPLIFIER ARRANGEMENT

FIELD OF THE INVENTION

This invention relates to optical amplifier arrangements, which are for example provided at regular intervals along optical fibers within optical communication networks. These amplifier sites typically comprise optical nodes at which signal amplification takes place in addition to some sites at which signal routing functions are also preferred.

BACKGROUND OF THE INVENTION

When long haul, regional or metro optical communication networks are installed, amplification sites are required at intervals along the optical fiber spans. These sites provide amplification to compensate for fiber losses over the preceding span. Current technologies allow a maximum span between sites of approximately 80 km. The amplification sites may also compensate for other distortions arising in the preceding span, for example chromatic dispersion or polarization mode dispersion.

When the network is initially installed, some of the amplification sites will provide only the amplification and other compensation functions, and will not be required to perform any signal routing functions. Other sites, however, will require add/drop or signal routing capability to enable signals to be branched off the main span or to be provided to the span. These routing nodes require some form of routing arrangement to allow signals to be added or removed from the fiber span. A patch panel may be used for this purpose, or other manual routing arrangement, or else a switching core may operate in a wavelength-dependent manner. A switching core is the most expensive part of the node design, and sufficient switching capability will only be provided for the current or short term expected traffic requirements. Some redundancy in the switching capability of the communication system may be factored into the design at the outset, dependent on the requirements for availability at this node.

FIG. 1 shows an example of a known node architecture at which amplification and signal routing functions can take place. For the purposes of clarity, the components required for transmission from west to east are shown in FIG. 1, although it will be appreciated that the node will in fact be arranged for bi-directional flow of traffic. The node 10 receives an incoming WDM signal from the west and amplifies this signal using a first amplifier 12. The amplified signal is provided to a dispersion slope compensation module 14. A first booster amplifier 16 prepares the signal for the signal routing part 18 of the node.

There are two amplifiers 12,16 at the input side of the node because the loss which can be sustained between two amplifiers is limited. Typically, the dispersion compensation module 14 may introduce a loss of up to 10 dB and a switching core may introduce a loss of up to 15 dB. There are, however, numerous other possible configurations for the amplifier stages.

There is a maximum power per wavelength at which light can be launched into a fiber before the non-linear distortions make the signal unusable. This limits the power of the booster 16, but the power of the booster amplifier can be increased if it is followed by a linear loss element (such as a switch). The signal routing part 18 has a wavelength de-multiplexer 20 which divides the incoming WDM signal into individual channels or groups of channels 22. These channels 22 are switched by a switching arrangement 24 which, in addition to routing signals across the node 10, also provides add and drop capability, not shown. The switching arrangement is commonly termed "switching core". The output signals 26 from the switching core 24 are provided to a bank 28 of variable optical attenuators which are provided for channel balancing. The balanced channels are then combined by a multiplexer 30 to define the output of the signal routing portion 18. This output is then amplified by a second booster amplifier 32 to define the east bound output of the node 10.

This node configuration will be well known to those skilled in the art. In such an arrangement, the switching core 24 can provide per-channel routing of signals. However, this switching core 24 is an expensive component and will not be installed at every amplifier node where this level of switching capability is not initially required. However, subsequent changes to the network may require the switching capability at a node to be upgraded. Increasing the switching capability also increases the loss of the signal routing portion 18 so that the booster amplifier 16 will also require upgrading to support the increased switching capability.

The node illustrated in FIG. 1 is shown in simplified schematic form. For clarity, FIG. 2 shows the node architecture in which the node can perform signal routing operations between three fiber spans, to the east, west and south of the node. Thus, the node architecture shown in FIG. 2 implements a Y-branch. The incoming fibers from the east, west and south each undergo amplification, dispersion compensation, first stage boosting and de-multiplexing using the same components as described in connection with FIG. 1. In the example shown in FIG. 2, each de-multiplexer 20 provides five channels on different respective wavelengths. In the example shown in FIG. 2, the switching arrangement 24 has individual switching planes 25 for each of the different wavelengths. For example, the switching plane 25a receives as input the first channel 22a from each of the multiplexers 20, and each of these channels 22a are on the same carrier frequency. This enables the switching arrangement 24 to be designed as a number of separate switching planes 25, each designed for a specific wavelength. Furthermore, the node can be arranged to add or drop signals on predetermined wavelengths by modification to one of the switching planes only. The outputs of the switching arrangement 24 are again provided to a bank 28 of variable attenuators before being combined by multiplexers 30 to form the individual east bound, west bound and south bound signals.

In order to avoid the need to provide full switching capability when a network is installed, the node architecture needs to be designed to enable upgrades to be performed. There is also a need to provide protection/duplication of equipment to enable repair or servicing of components within the node.

SUMMARY OF THE INVENTION

The inventors have firstly recognised the need to provide protection for the switching arrangement 24, as it may require servicing or repair, and it may also be desirable to change some of the switching planes, or to add new switching planes, to allow different signal routing capability. One possible way of providing this protection is shown in FIG. 3. In this arrangement, two switching cores 24a, 24b are provided. An array of splitters 40 provides the individual channels or groups of channels 22 on two different paths, each leading to a different switching arrangement 24. The outputs from the two switching arrangements 24a, 24b are then applied to a bank 42 of two-way switches which enable one or other of the inputs to be routed to the bank of variable optical attenuators 28. This arrangement enables the switching core 24 to be replaced for upgrade or maintenance and provides duplication only of the switching arrangement itself. By providing two separate paths for the different switching arrangements 24 protection is provided, but this protection is not provided for the bank 28 of attenuators, and this arrangement does not allow upgrade of the de-multiplexer 20 and multiplexer 30 without interrupting normal service.

One way to overcome these disadvantages is to provide two full signal routing portions 18a, 18b between the splitter 40 and the switch 42 as shown in FIG. 4. In this way, the whole signal routing portion 18 is protected so that the failure of any component within the signal routing portion 18 is protected and all components can be upgraded without interrupting service through the node. However, if a switching arrangement 24 is being added to a node with no switching capability, this will normally require upgrade of the first booster amplifier 16, and the arrangement of FIG. 4 requires an interruption of service to enable this upgrade.

According to a first aspect of the invention, there is provided an optical amplifier arrangement comprising:
  a splitter for providing an input WDM optical signal on at least first and second output paths;
  an optical amplifier for amplifying the WDM optical signal in at least one of the paths;
  a signal routing arrangement for routing individual channels or groups of channels of the WDM signal within the at least one of the paths; and
  a switch for selecting the signal from one of the at least first and second output paths.

In this arrangement, there are two paths between the input and output. The path in use (the "at least one of the paths") includes an optical amplifier and a switching arrangement. Whilst this path is being used, the components in the other path can be upgraded. For example, a switching arrangement may be provided in the other path, and an amplifier may also be upgraded, without disrupting service in the path in use. This enables an amplifying node within an optical communications system to be incrementally upgraded.

For example, the switching arrangement may comprise at least one wavelength-selective tap for tapping a selected wavelength channel from the WDM signal. This wavelength may be dropped or routed to a new span through a manually-provisioned patch panel. This may be upgraded in the unused path to a multiple input and multiple output switching core for automatically routing individual channels of the WDM signal. This upgrade requires the amplifier in the path to be upgraded, and this can also be done without disrupting service in the path in use. The switch is then controlled to receive signals from the upgraded path.

The two paths can be upgraded in turn, so that in the fully upgraded arrangement, a switching core is provided in each of the first and second output paths, and each switching core is provided with a wavelength division de-multiplexer at the input of the core for dividing the WDM signal into individual channels or groups of channels.

In one embodiment, the outputs of the switching cores are provided to the switch, and a wavelength division multiplexer is provided at the output of the switch. The switch thus receives individual channels, and can therefore be arranged as a switch array, which can select different channels from different paths. This means that the arrangement can provided per-channel protection.

Alternatively, each switching core can be provided with a wavelength division multiplexer at the output of the core for combining the WDM channels into an individual WDM signal, and wherein the WDM signals from the two multiplexers are provided to the switch. The switch thus switches the WDM signal, so that per-channel protection is not possible. However, by placing the multiplexer before the switch, the multiplexer in the unused path can be upgraded or replaced without disrupting service.

When each switching core is provided with a wavelength division multiplexer at the output of the core for combining the WDM channels into a WDM signal, a further amplifier may also be provided in each path for amplifying the WDM signals, the amplified WDM signals being provided to the switch. The further amplifier (which is a second booster amplifier) is then upgradeable.

In some embodiments, the output of the switch is further amplified before defining the output of the amplifier arrangement.

According to a second aspect of the invention, there is provided an optical amplifier arrangement comprising:
  an amplifier section, comprising:
    a splitter for providing an input WDM optical signal on at least first and second output paths; and
    an optical amplifier for amplifying the WDM optical signal in at least one of the paths; and
  a switching core section at the output of the amplifier section, comprising:
    a de-multiplexer for dividing an amplified WDM signal into individual channels or groups of channels;
    a splitter for providing the divided channels on at least third and fourth output paths;
    an optical switching core in each of the third and fourth paths; and
    a switch for selecting the output of one of the switching cores.

This arrangement provides the ability to upgrade the amplifier to a higher power version, thus compensating for the loss in the switch, and avoids the need to provide upgraded amplifiers in two separate paths.

The invention also provides an optical communications system comprising a plurality of nodes connected by optical transmission lines, wherein at least one node is provided with an optical amplifier arrangement according to the invention.

The invention also provides a method of upgrading an optical amplifier arrangement, comprising defining a first path between an input and an output of the amplifier arrangement, the first path including a splitter;
  amplifying the signal in the first path using a first amplifier positioned downstream of the splitter and routing the amplified signal from the first path towards the output;
  defining a second path between the input and the output of the amplifier arrangement, the second path including said splitter;
  providing an amplifier and a channel routing device in the second path downstream of said splitter; and
  routing the amplified signal from the second path towards the output.

This method allows a channel routing device to be installed or upgraded, with installation of the required booster amplifier, without disrupting operation of the arrangement. By "routing a signal towards the output" is meant that the signal ultimately contributes to the output signal, but that additional operations may be carried out on the signal before it defines the output of the optical amplifier arrangement.

For example, the amplified signal may undergo further amplification before defining the output of the arrangement.

The method may further comprise upgrading the amplifier and providing or upgrading a channel routing device in the first path downstream of said splitter. In this way, both paths may be upgraded in turn, without disrupting service, so that the fully upgraded arrangement can provide 1+1 protection.

The signal is preferably routed from the first or second path towards the output by a switch.

BRIEF DESCRIPTION OF THE DRAWINGS

Examples of the invention will now be described in detail with reference to the accompanying drawings in which.

Figure 1:
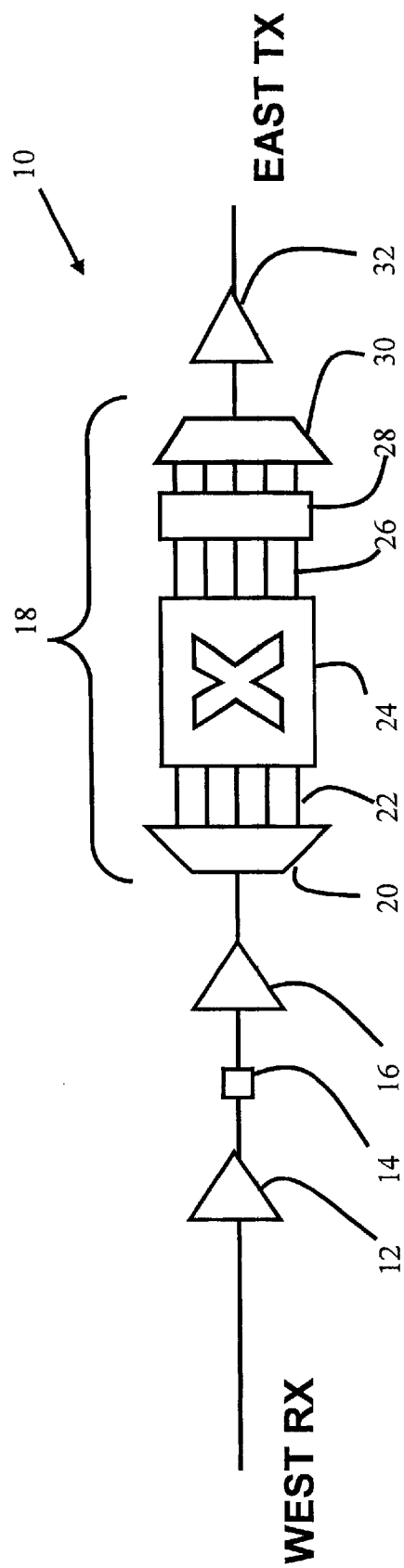
FIG. 1 shows schematically a known node architecture.
Figure 2:
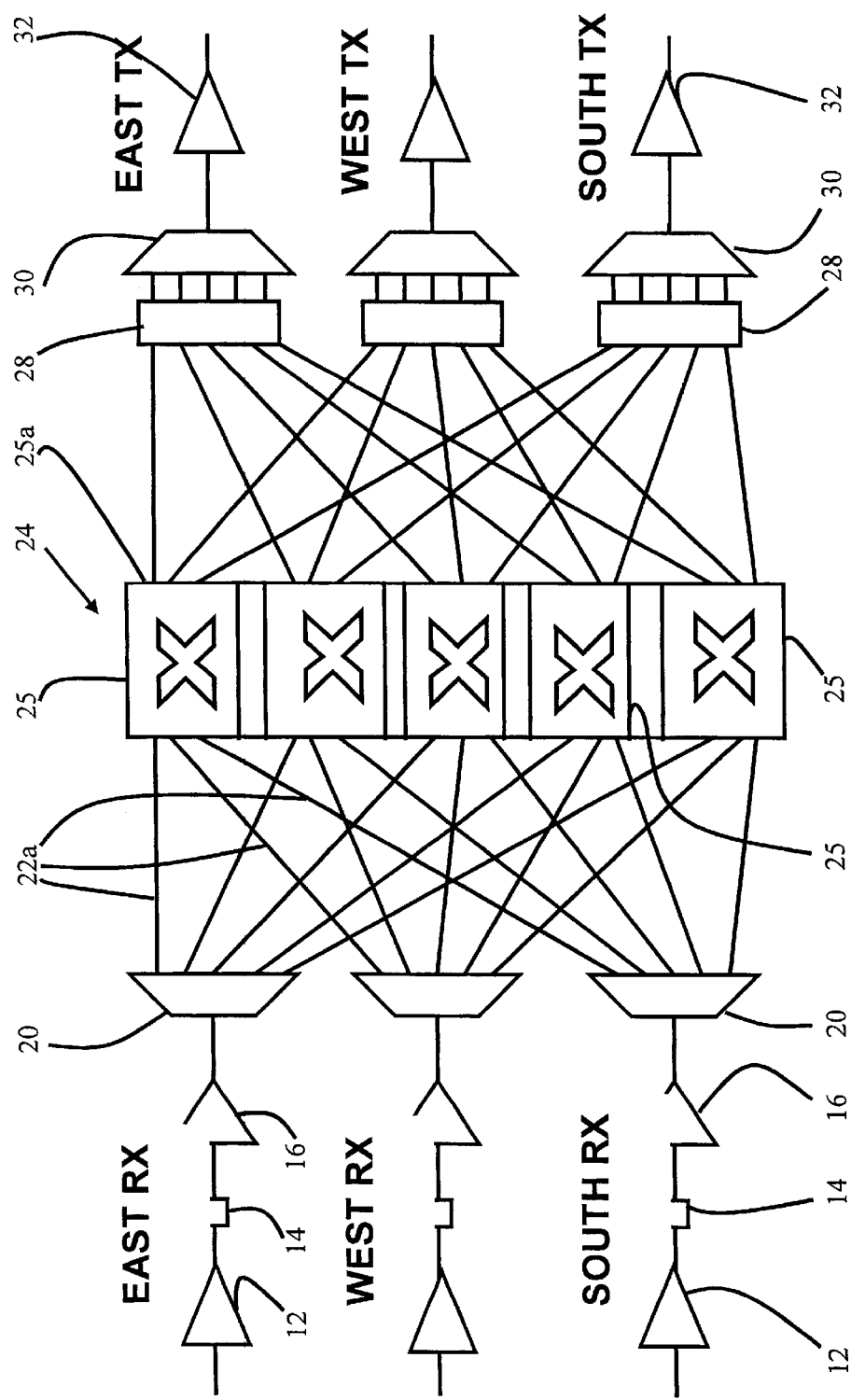
FIG. 2 shows the node architecture of FIG. 1 in greater detail.
Figure 3:
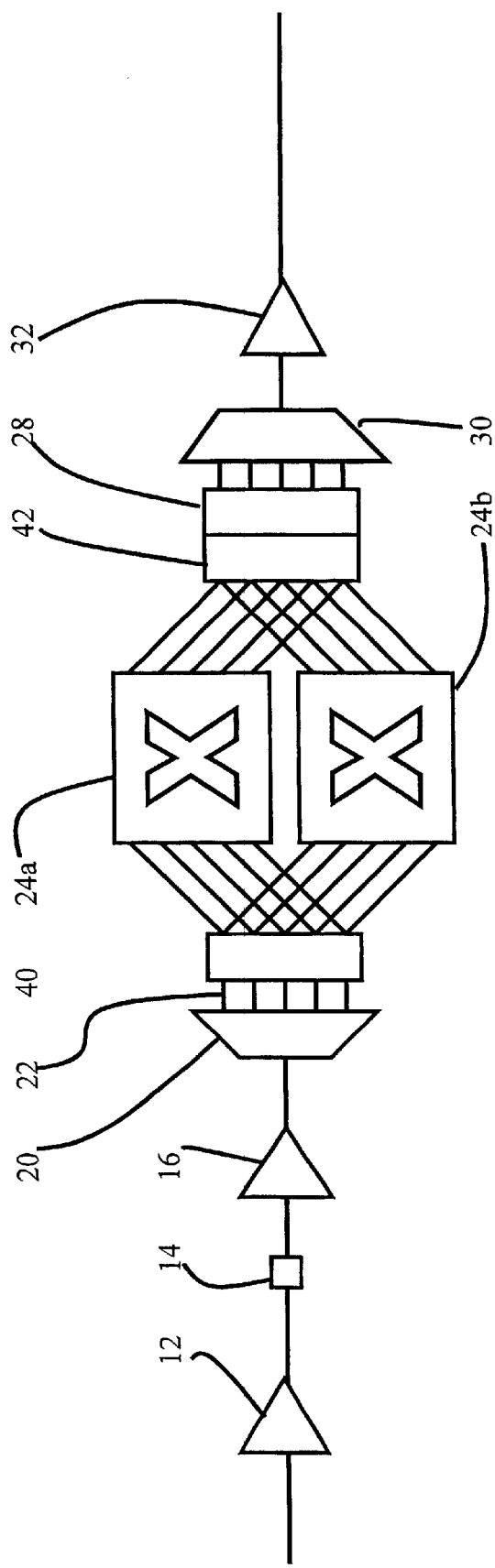
FIG. 3 shows one possible node architecture for protecting the switching core of the node.
Figure 4:
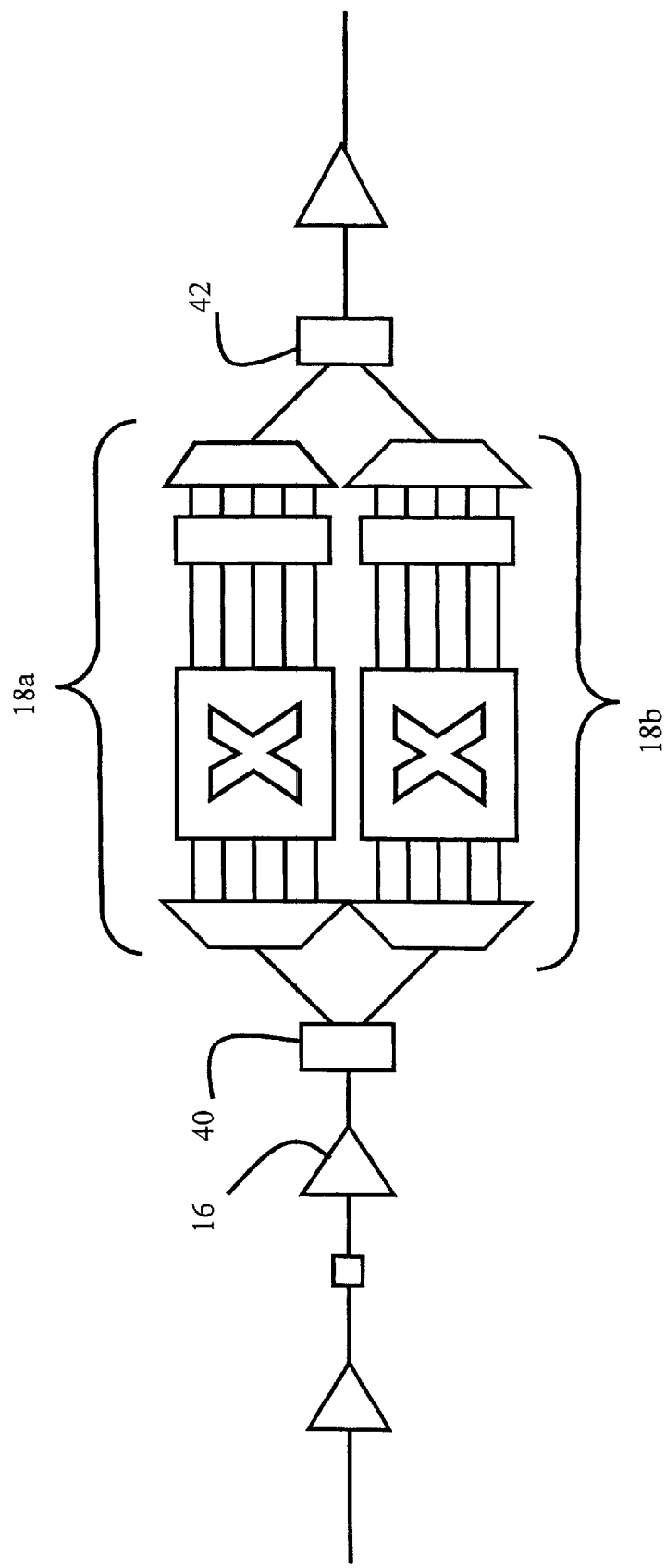
FIG. 4 shows one possible node architecture for protecting the complete signal routing part of the node.

DETAILED DESCRIPTION OF THE INVENTION in the following detailed description, the invention is described in connection with one plane through the node. In the same way that FIG. 1 represents one plane through the node architecture of FIG. 2, the invention is described in connection with one input port, one output port, and a single switch which will in practice form part of a multiple plane node architecture with multiple inputs, multiple outputs, and a multi-plane switch.

Figure 5:
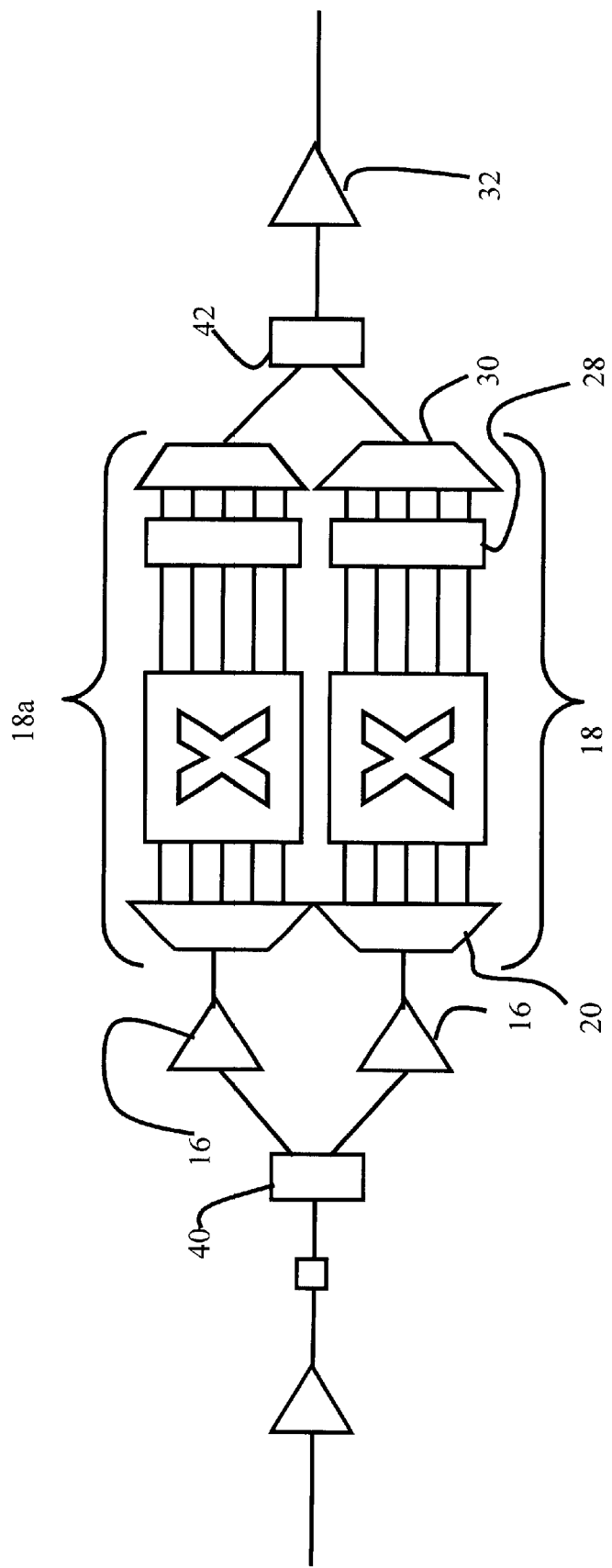
FIG. 5 shows a first example of switching arrangement in accordance with the invention.

FIG. 5 shows a first example of switching arrangement in accordance with the invention. In the following examples, this switching arrangement will be described as a "node", as the arrangement will typically be used within a node of an optical communication system. This node is provided for amplification of optical signals and optionally the routing of signals around the network.

In the following examples where the same components are used as described in connection with FIGS. 1–4, the same reference numerals will be used.

In FIG. 5, two paths are provided between a splitter 40 and a switch 42. Each path includes its own first booster amplifier 16 and signal routing portion 18. In this example, the splitter 40 and the switch 42 operate on the combined WDM signal. The splitter 40 is a 3 dB coupler which provides equal powers on the two output branches. The switch 42 is a two way, or 2×1 switch, which provides at its output the full signal from the selected input. The switch could also be a 2×2 switch, which provides at its main output the signal from the selected path. It also provides at a second output the signal from the non-selected path through the signal routing portion 18. This allows monitoring of the signals flowing through the inactive path, to ensure that the inactive path is operating correctly before switching to it.

This arrangement enables one path to be used, by selecting the appropriate input at switch 42 whilst the components in the other path can be upgraded or repaired. This upgrade or repair function will typically involve adding a switching arrangement 24 and this will require a corresponding increase in the amplification power of the first booster amplifier 16. By providing protection both for the first booster amplifier 16 as well as the signal routing portion 18, additional upgrade functions can be performed without disrupting the operation of the node.

The arrangement of FIG. 5 allows the frequency plan to be upgraded. For example, it the first path uses a 40 lambda system with wavelengths spaced 100 GHz apart, the second upgraded path can be upgraded to use an 80 lambda system with wavelengths spaced 50 GHz apart. It would also allow movement from a banded structure to a system that used individual wavelength granularity.

Figure 6:
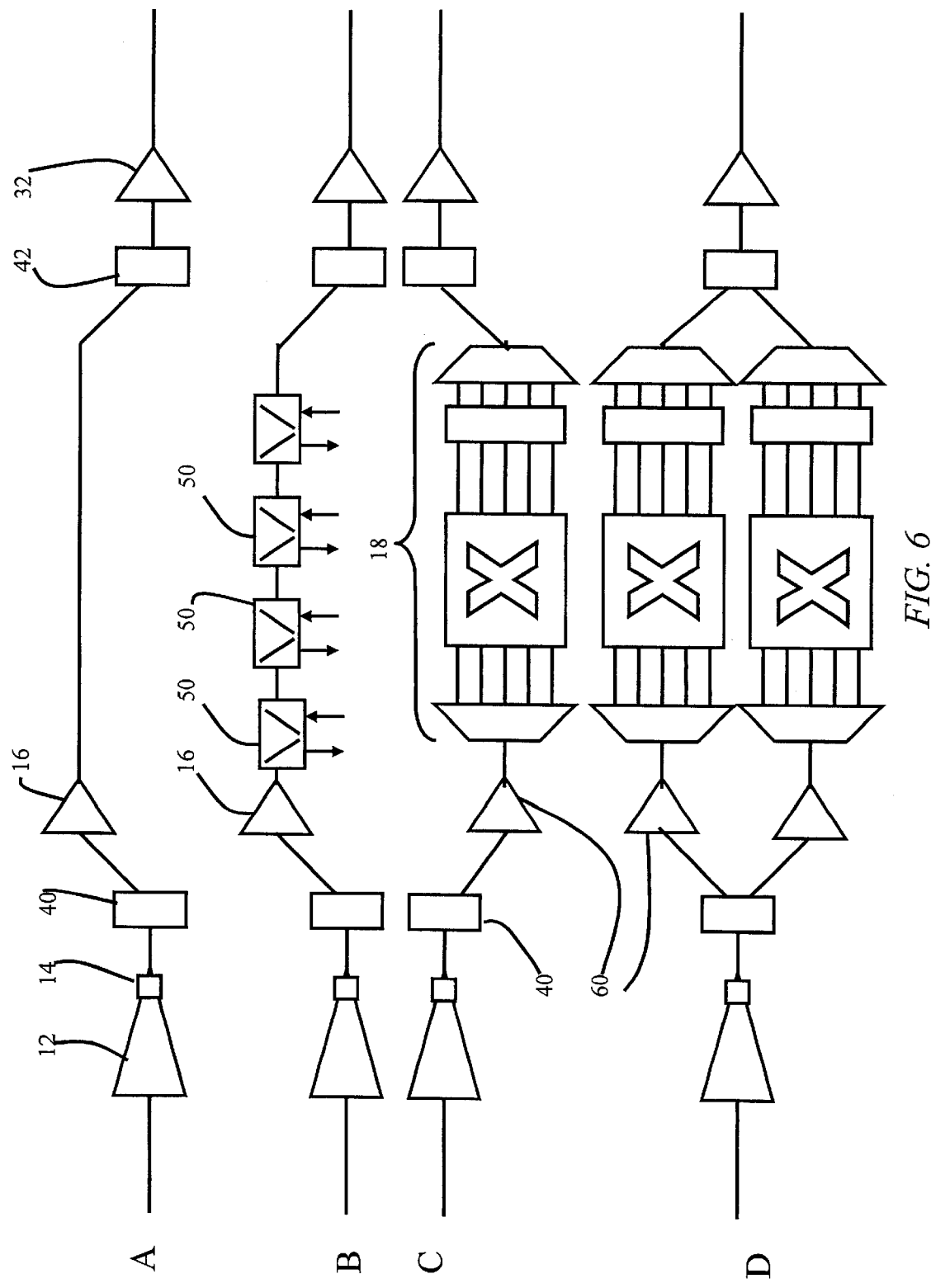
FIG. 6 is an example of an upgrade sequence leading to the architecture of FIG. 5.

By way of example only, FIG. 6 shows one possible upgrade scheme provided by the invention.

FIG. 6A shows an amplification site in which no add/drop capability is initially required. To enable this amplification site to be upgraded in accordance with the invention, it is nevertheless provided with the splitter 40 (the outputs of which may require isolators) and switch 42, with the booster amplifier 16 between the splitter 40 and switch 42. Thus, a first path is defined which includes the splitter 40 and which includes an amplifier (the first booster amplifier 16) down stream of the splitter 40. The switch 42 is positioned to route the amplified signal from the amplifier 16 towards the output, in particular to the second booster amplifier 32.

FIG. 6B assumes that some add/drop capability is now required at the site of the node, for example as a result of a population increase at that location. In order to achieve the adding or dropping of a small number of wavelengths at lowest cost, a number of optical add/drop couplers 50 can be provided in the first path, again between the splitter 40 and the switch 42. During installation of the components 50 alternative protection paths through the network can be employed to avoid the need to disrupt service. Alternatively, the couplers 50 can be installed in the second path, with an associated amplifier 16 in that path, and the switch 42 is then switched once the second path is installed.

As the requirement for additional add/drop or signal routing capability increases, an upgrade is carried out in the unused path. In the example shown in FIG. 6, a second path is defined, which again includes the splitter 40. An amplifier 60 is provided in the second path together with a full signal routing portion 18. The amplifier 60 will typically have a higher power than the amplifier 16, in order to compensate for the higher lose of the signal routing portion 18. Traffic can then be switched to the second path, by controlling the switch 42 to route signals from the second path to the second booster amplifier 32. This then enables the first path to be upgraded. In particular, the components 50 are replaced by a full signal routing portion 18 and the first booster amplifier 16 is replaced with an amplifier with a similar specification to that of amplifier 60. The configuration shown in FIG. 6D then corresponds to that described with reference to FIG. 5.

The arrangement of the invention enables an incremental upgrade operation to be carried out. For example, the number of switching planes providing add/drop and signal routing capability can be incrementally increased, and each time an upgrade is taking place the switch 42 will select as input the path not at that time being disrupted.

Figure 7:
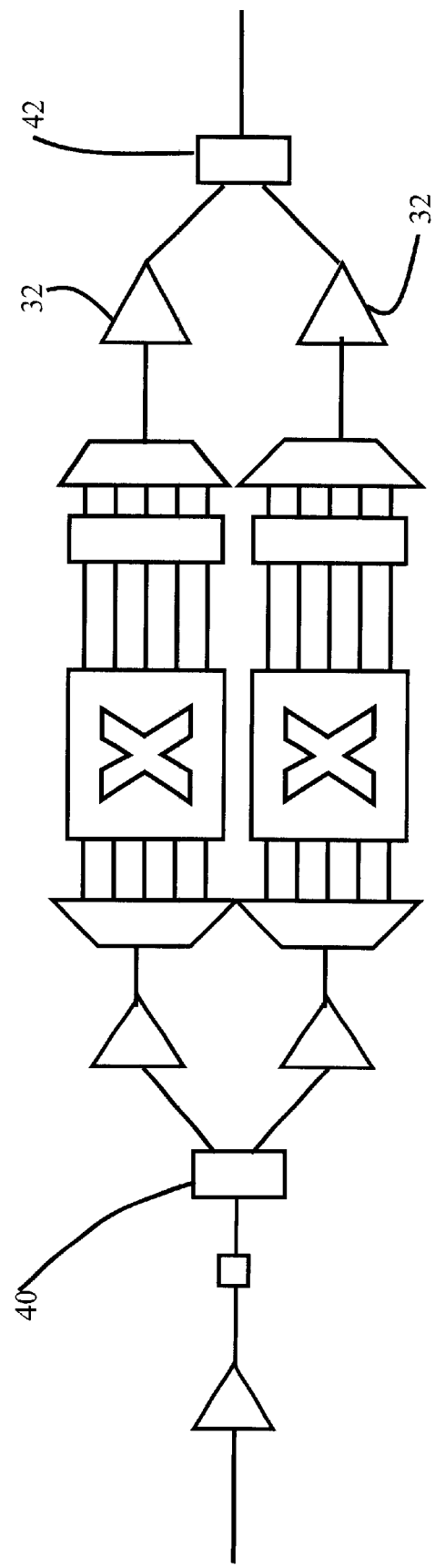
FIG. 7 shows a second example of switching arrangement in accordance with the invention.

FIG. 7 shows a variation to the arrangement of FIG. 5, in which the second booster amplifier 32 is also duplicated, with one second stage booster amplifier 32 being provided in each of the two paths between the splitter 40 and the switch 42. The second booster amplifier 32 is then also upgradeable. Furthermore, placing the switch 42 after the second booster amplifier 32 removes the loss of the switch from the second mid-stage. The power of the amplifier 32 can be increased to compensate for the loss of the switch 42.

The examples above each provide protection for all components of the signal routing portion 18, to enable repair or upgrade of any of those components. This is, however, at the expense of large duplication of components within the node. Furthermore, the switch 42 in each of the examples above switches the full WDM signal, so that the protection provided is for the full god switch rather than on a per-channel basis.

Figure 8:
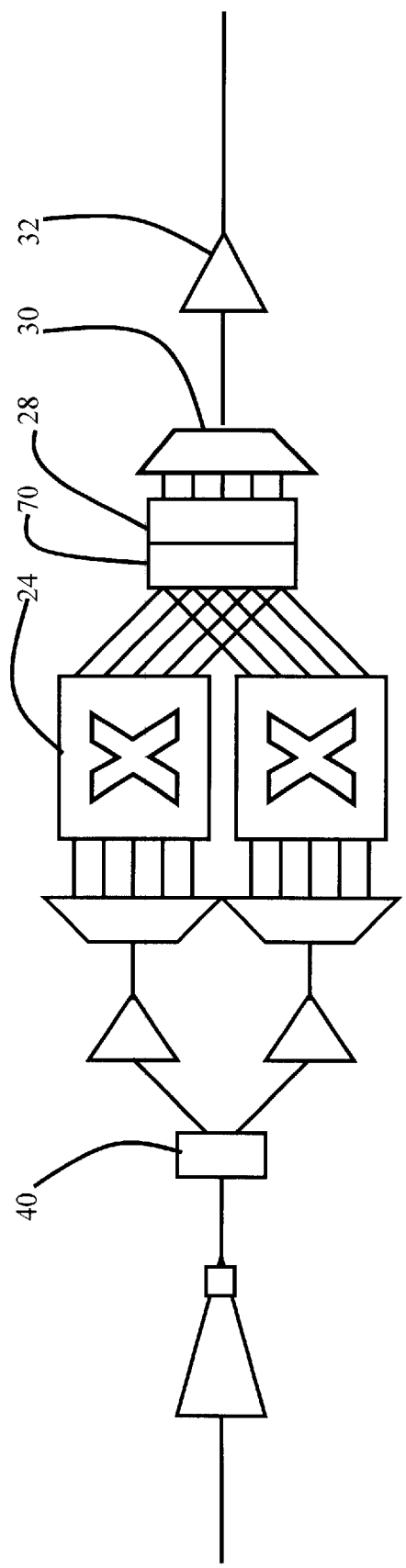
FIG. 8 shows a third example of switching arrangement in accordance with the invention.

FIG. 8 shows a further example of node in accordance with the invention which enables upgrade of the switching arrangement 24 but which also provides per-channel protection. In this example, the two paths are provided between the splitter 40, which acts on the full WDM signal, and a bank 70 of switches which enables switching of the individual channels or groups of channels. In this case, the bank 70 of switches receives the outputs from the two switching arrangements 24 and can select on an individual channel (or channel group) basis which of the two paths to route to the bank 28 of variable optical attenuators. A single multiplexer 30 is thus provided down stream of the bank 70 of switches, the output of which is provided to the second booster amplifier 32. With this arrangement, the multiplexer 30 cannot be upgraded without interrupting service. As a result, the initial node configuration must include full de-multiplexing and multiplexing to enable subsequent upgrades to be carried out without modifying the multiplexer 30.

Figure 9:
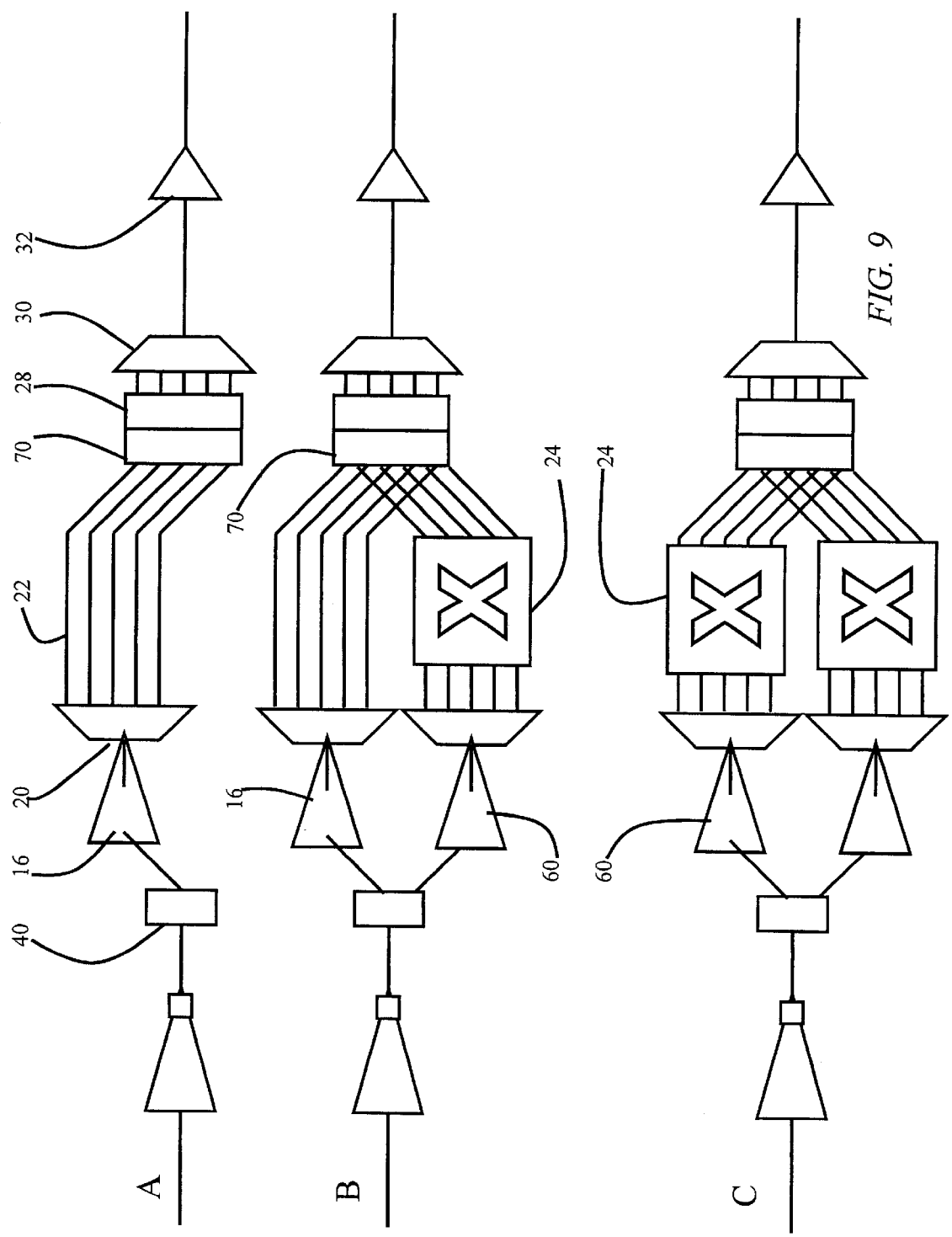
FIG. 9 shows one example of an upgrade sequence resulting in the architecture of FIG. 8.

FIG. 9 illustrates one example of upgrade method to provide the node configuration of FIG. 8. In FIG. 9A, even though no switching capability is initially required, the first path between the splitter 40 and the bank 70 of switches is nevertheless provided with a de-multiplexer 20 to provide the individual channels or groups of channels 22. This full break out of channels allows add/drop and signal routing connections to be manually configured using a fiber patch panel. A normal first booster amplifier 16 will provide the required amplification taking into account the loss resulting from the de-multiplex and subsequent multiplex operation.

When upgrade of this node is required, the second path is defined and is provided with a switching core 24 having add/drop and signal routing capability. A higher power first booster amplifier 60 will be required to compensate for the loss of the switching core 24. When the second path has been upgraded, the bank 70 of switches is controlled to receive signals from the second path, which in turn allows upgrade of the first path to provide the add/drop and signal routing capability. This involves providing a switching core 24 in the first path and upgrading the first booster amplifier 16 to provide amplifier 60, as shown in FIG. 9C.

The arrangement of FIG. 9 enables per-channel protection as well as upgrade of the switching core 24. This is again achieved with a single splitter 40 and a single bank 70 of switches. By duplicating the first booster amplifier 60 in each of the paths between the splitter 40 and the bank of switches 70, there is duplication of the high power first booster amplifier 60.

Figure 10:
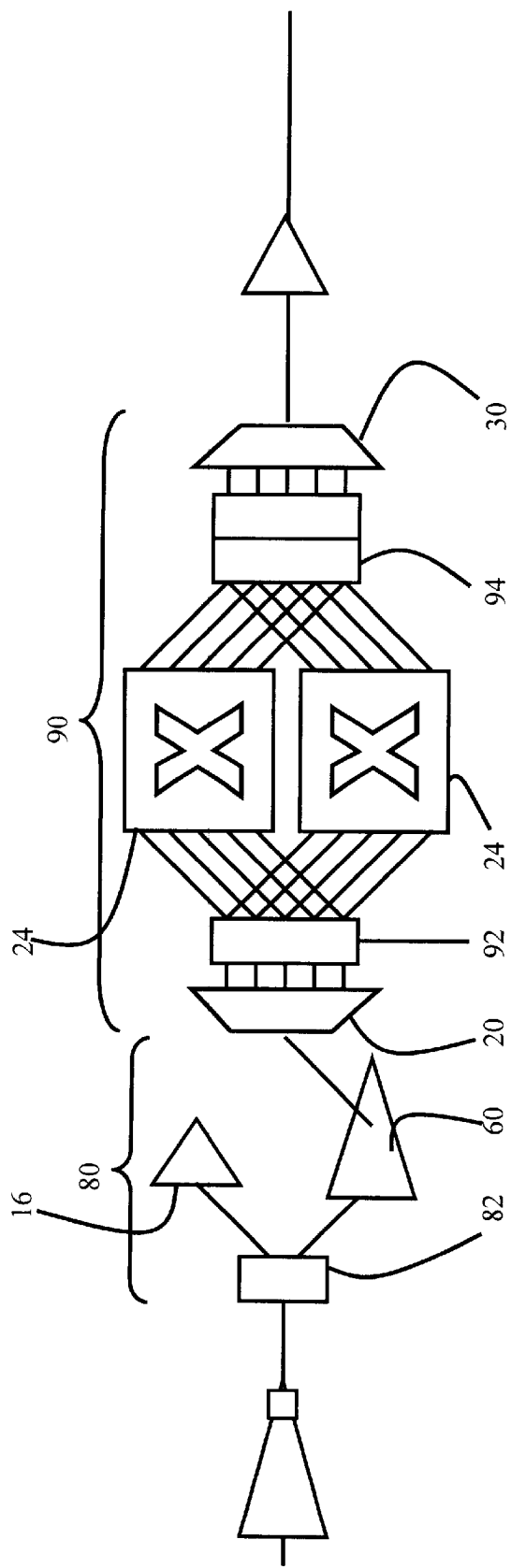
FIG. 10 shows a fourth switching arrangement in accordance with the invention.

It may be beneficial to duplicate the high power booster amplifier, which is less reliable than a normal amplifier. However, FIG. 10 shows an alternative arrangement which also provides per-channel protection as well as the capability of upgrading the switching core, but which does not require two high power first booster amplifiers 60. The arrangement of FIG. 10 effectively comprises an amplifier section 80 and a switching core section 90. The amplifier section 80 has a first splitter 82 which provides the input WDM signal on to two paths. Within one of these paths is a low power first booster amplifier 16 which has a power sufficient for the initial configuration of the node in which add/drop capability is provided through a manual patch panel, but no switch is required. The second path has a higher power first booster amplifier 60 having sufficient power for the configuration in which a switch is provided. In the initial configuration of the node, the output from the low power first booster amplifier 16 is provided to the demultiplexer and patch panel arrangement (manual routing arrangement), whereas when the upgrade from the manual routing arrangement to the automatic switching core section 90 is carried out, the high power booster amplifier 60 is first installed and the output from that amplifier is connected to the switching core section 90 once it has been installed.

The switching core section 90 has a bank 92 of splitters and a bank 94 of switches surrounding two optical switching arrangements 24 to provide per-channel protection. The de-multiplexer 20 and multiplexer 30 are provided outside the branched pair of paths and are therefore not upgradeable.

FIG. 11 shows in greater detail the upgrade operation of FIG. 10 in which traffic is controlled by the node bi-directionally between three directions, east west and south. When the network is initially installed, the channel connections between the different paths are hard wired into the node, as shown in FIG. 11A, using a patch panel In this example, each bank 70 of switches has been integrated with the bank 28 of variable optical attenuators to provide the combined component 72 illustrated. In order to upgrade the node, the higher power first booster amplifiers 60 are installed and coupled to the splitters 40 as shown in FIG. 11B. The switching core 24 is then installed together with a bank of splitters 25 at the inputs of the switching core 24. The outputs of the switching core 24 are coupled to the bank 72 of switches and optical attenuators, as shown in FIG. 11C.

Figure 11A:
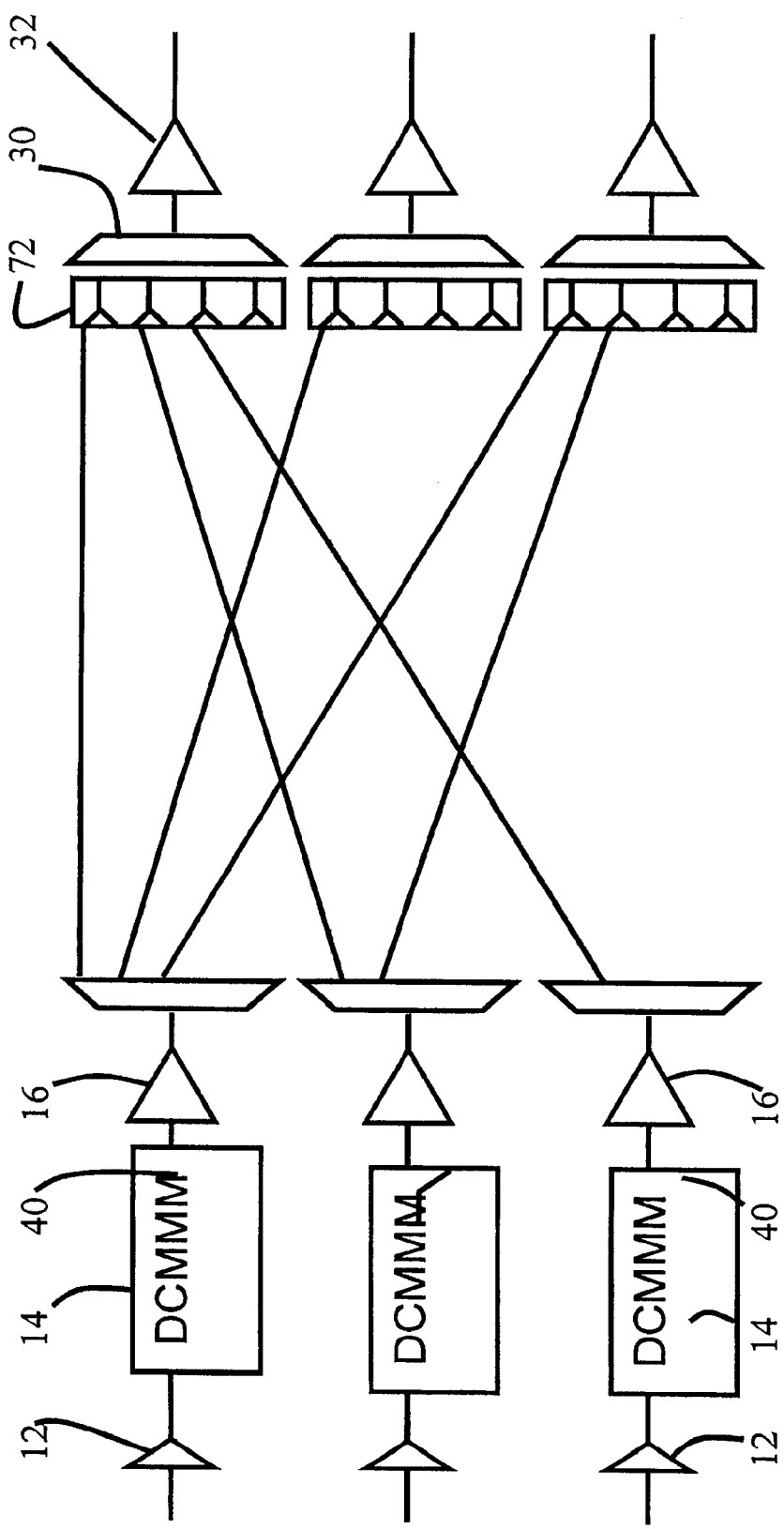
FIGS. 11a to 11d show a further upgrade example.
Figure 11B:
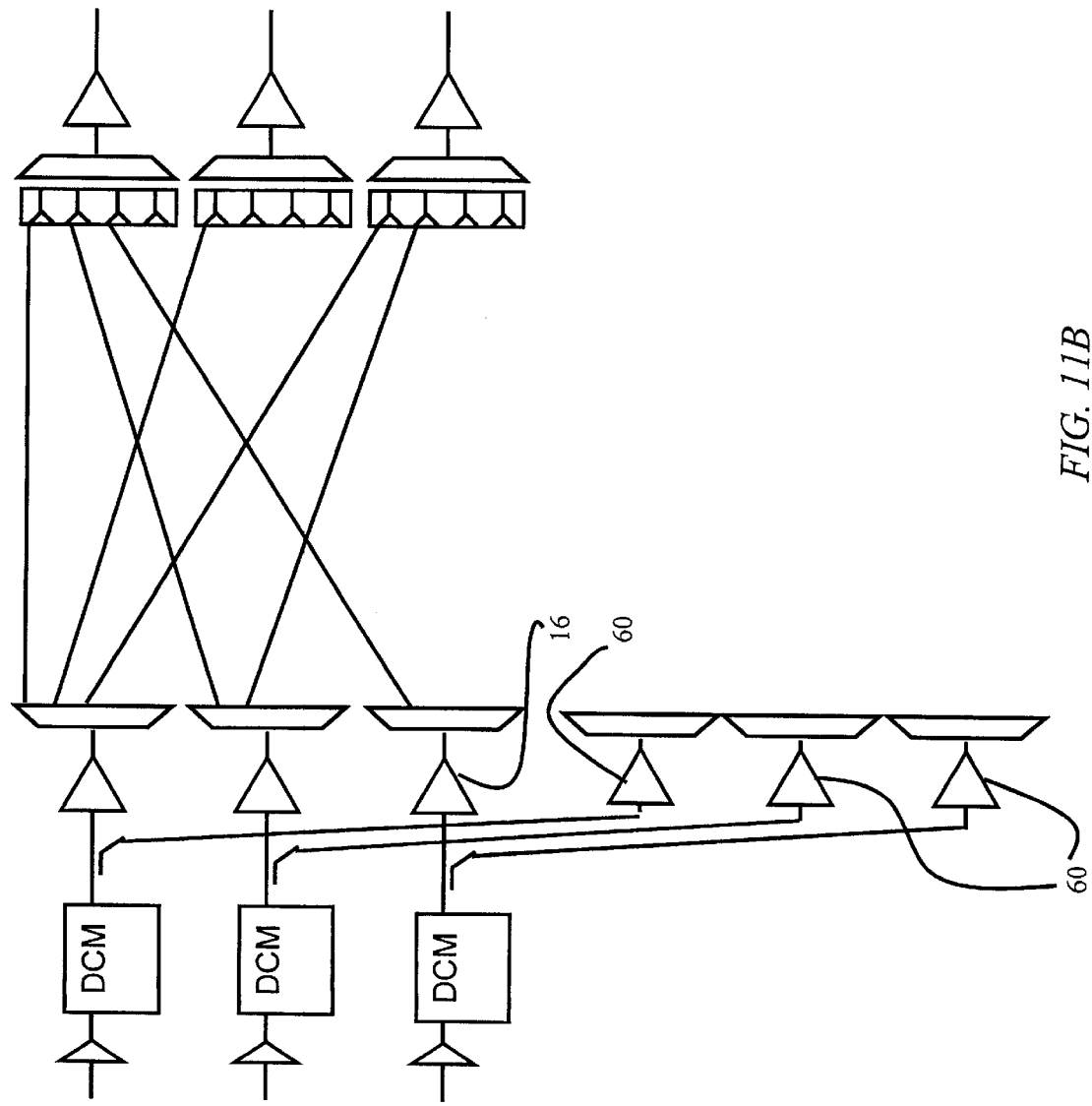
Figure 11C:
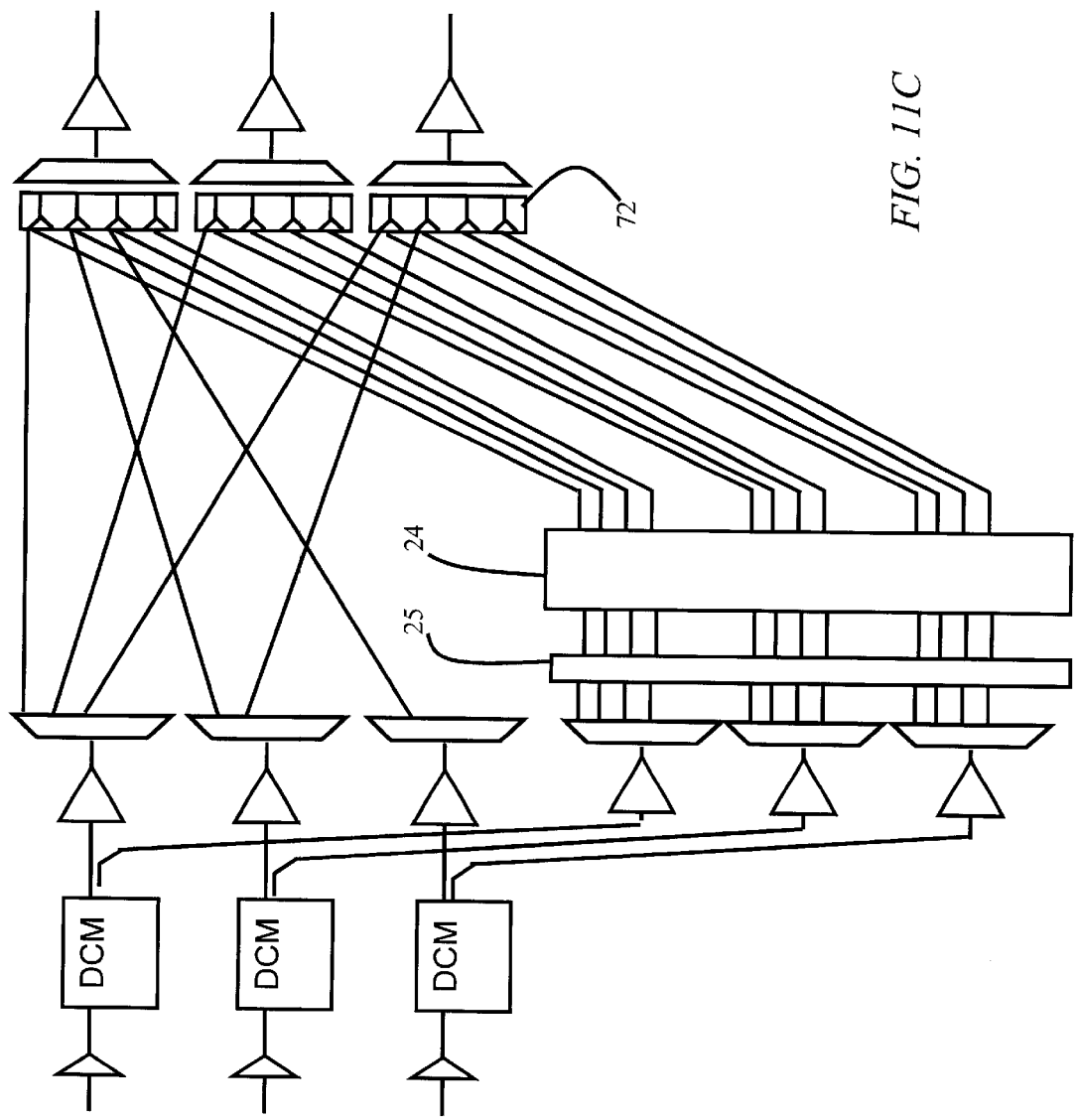
Figure 11D:
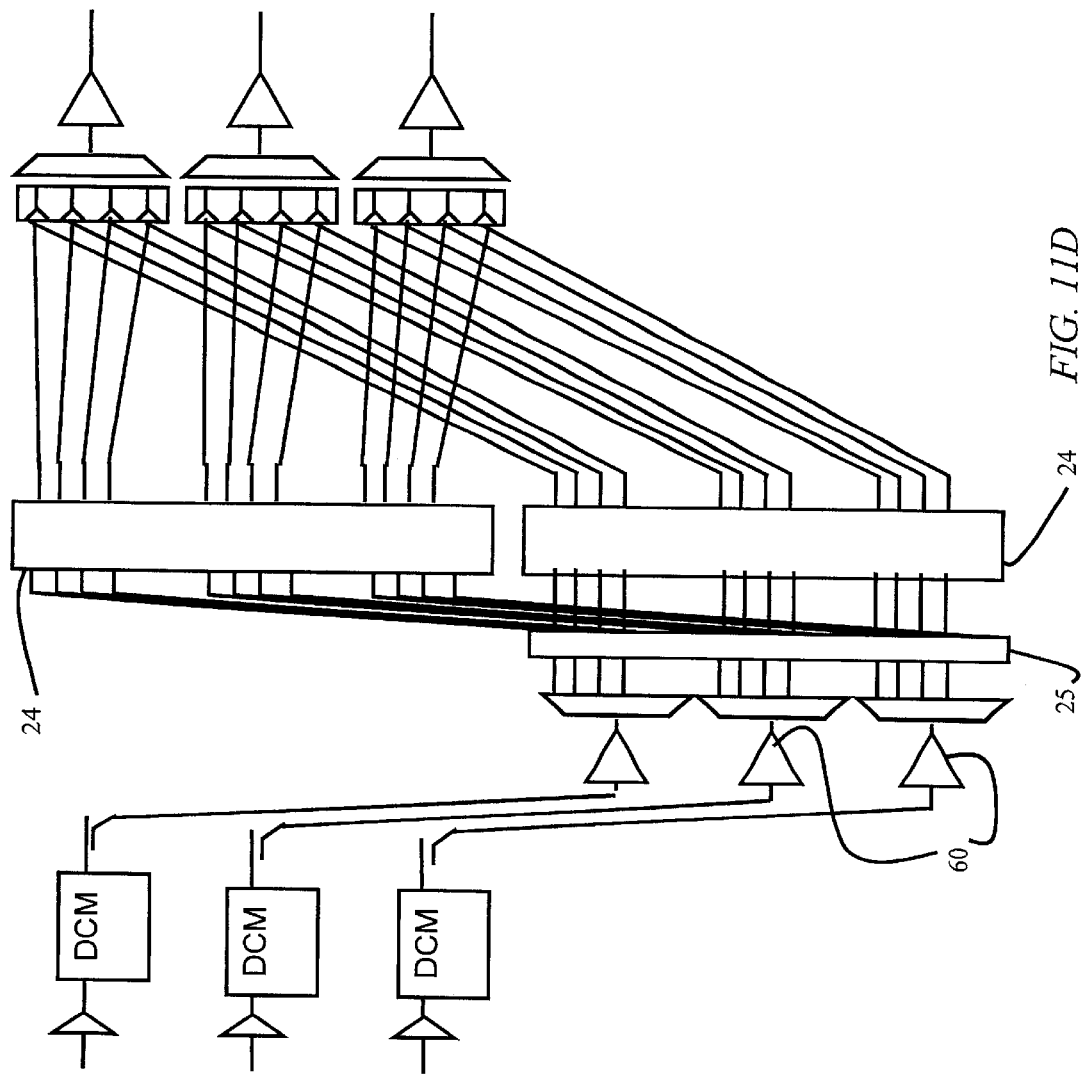

It is then possible to strip out the patch panel. The bank 72 is then controlled to receive signals from the switching core 24, thereby enabling a second switching core to be installed. This involves incorporating a second switching core 24 and connecting it to the new bank of splitters 25, as shown in FIG. 11D.

Figure 12:
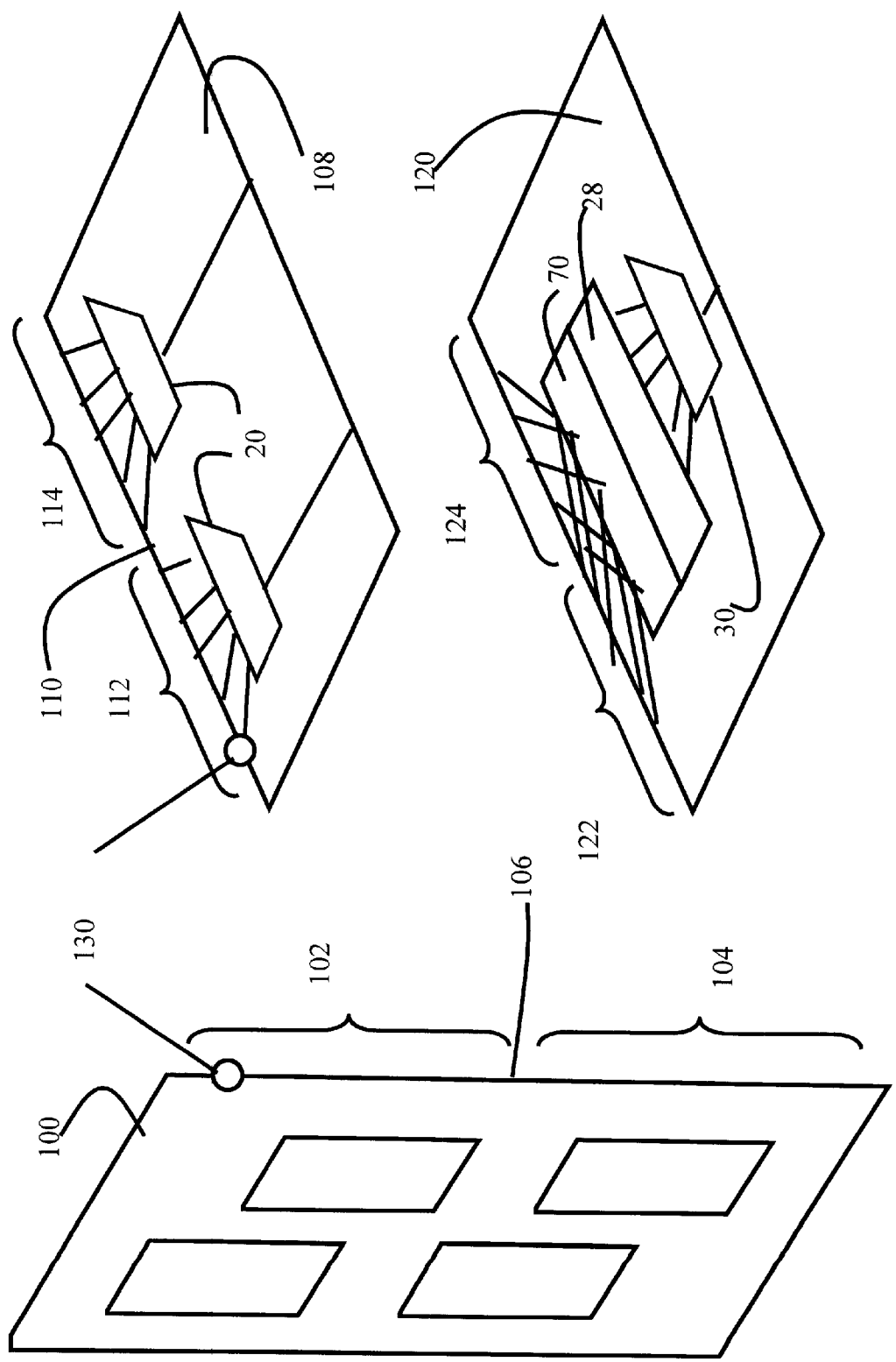
FIG. 12 shows schematically one possible physical node structure.

FIG. 12 shows in schematic form one possible way of implementing the node architecture in hardware. As shown in FIG. 12, each switch plane (such as 25 in FIG. 2) is implemented as a switch card 100 having inputs 102 and outputs 104 along an edge 106. Each switch card 100 may be for an individual wavelength or for a group of wavelengths. The two de-multiplexers 20 are provided on a first board 108 and provide the individual channel or channel group ports along an edge 110. These ports define a first series 112 for one path (for example the working path) and a second series 114 for the other path (for example the protect path).

The bank 70 of switches and the bank 28 of optical attenuators, together with the multiplexer 30 are provided on a second board 120, again providing individual working and protect channels or groups of channels in series 122 and 124. These series of individual channels or channel groups are arranged in the same order for the two cards 108, 120 so that a single switch plane 100 can interconnect all channels of the same wavelength for all boards. For example, a connection 130 is established where the edge 106 of the switch plane 100 meets the edge 110 of the board 108. The orthogonal card-to-card connections should be made through blind mate fiber optic connectors. These might be single fiber or multi-fiber connectors.

In the examples above, the multiplexers and de-multiplexers are shown as a single component, but they may be multi-stage components using interleaving operations. More specific details of the manner in which the node architecture may be implemented will be apparent to those skilled in the art.

Figure 13:
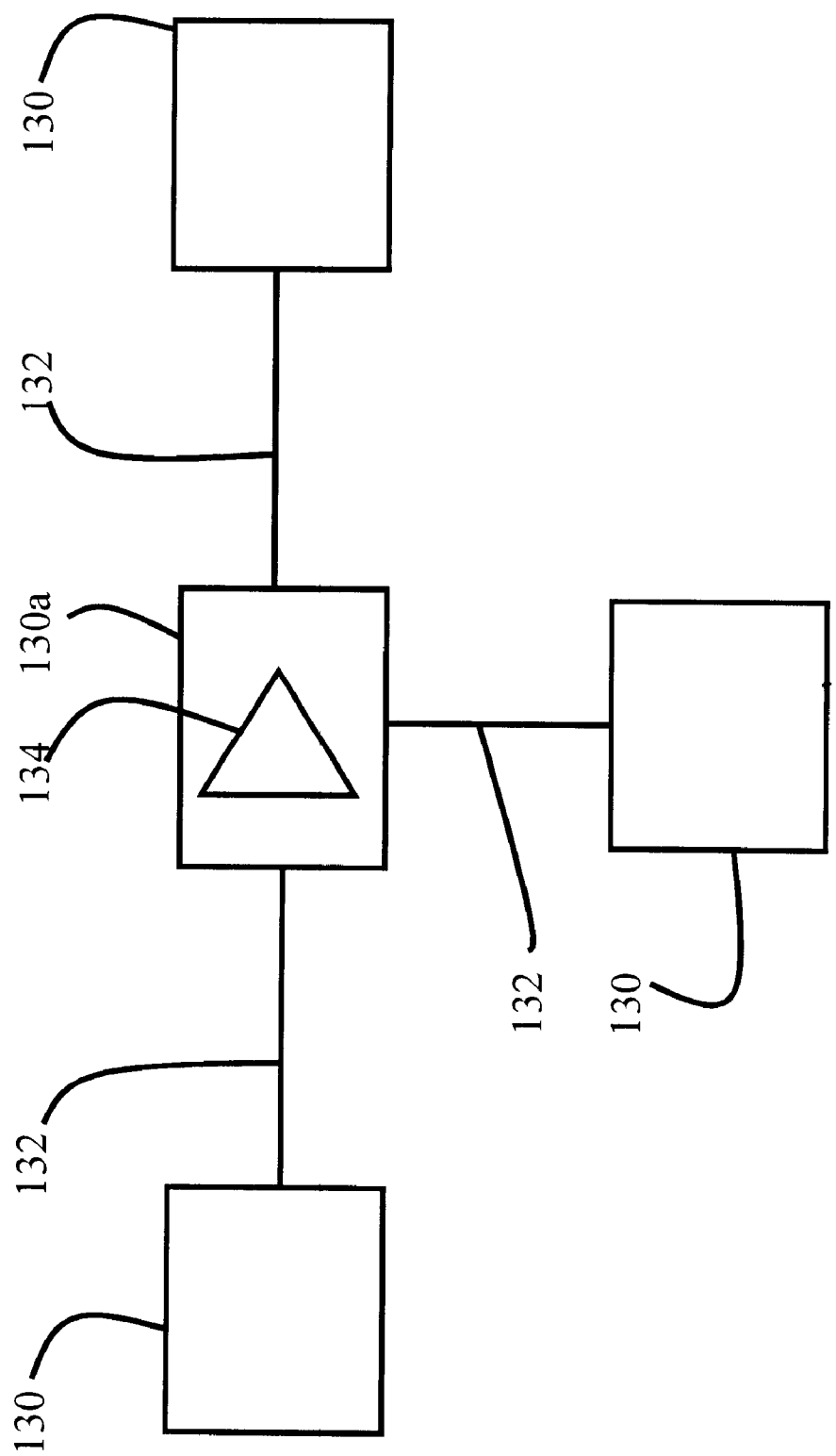
FIG. 13 shows a communications system employing an amplifier arrangement of the invention.

As discussed above, the amplifier arrangement of the invention may be used in a node of an optical communications system. As shown in FIG. 13, such a system comprises a plurality of nodes 130 connected by optical transmission lines 132, wherein at least one node 130a, which is an intermediate node, is provided with an optical amplifier and signal routing arrangement 134 of the invention.

Although the amplifier arrangement has been described in use in a node, it may find uses in other parts of a network. The splitter and the switch used in the design may take various forms, and are well known and used components. The splitter is any device for providing an input onto two different outputs.

In the examples above, the splitter provides the input on both outputs, so that protection switching may be implemented by operating the switch only. However, it is equally possible for the splitter to comprise a switch, so that the input is selectively provided on one or other output. This will result in a lower loss component, but means that both the splitter and the switch must be controlled to enable use of the second path for protection or to enable upgrade of the main path. Another benefit of providing the splitter output on both paths simultaneously is that signals are provided to the protection paths so that the protection path can be tested before switching to it. However, the term "splitter" is intended to cover any component which enables an input to be provided on at least two outputs, whether simultaneously or selectively, possibly with isolators. It also covers a single input or multiple input device.

There are a large number of possible designs for the optical amplifiers used within the arrangement, and these will depend on the particular signal traffic through the switching arrangement. Amplification is often carried out using Erbium doped amplifiers—these may be fiber based or waveguide based, and other rare-earth dopants can be used, for example Thulium and Ytterbium. Raman amplifiers are also known for use in broadband amplification systems.

The switching arrangements may be all optical or they may be hybrid systems, in which the switching takes place in the electrical domain. In all optical systems, the switching operation is effectively a reflection, for example using arrays of MEM (micro-mechanical mirrors).

All of these possibilities are intended to be within the scope of the invention as claimed.

The use of Variable Optical Attenuators has been described above for channel balancing. As an alternative, per channel amplifiers can be used either in addition to the VOAs or instead of them. The signal routing portion may also include discrete per channel or per band amplifiers to mitigate some more of the loss.

Only a small variety of specific node configurations have been shown. The invention will be of benefit to any node configuration in which there is at least one booster amplifier before the signal routing section.

We claim:

1. An optical amplifier arrangement comprising:
    a splitter for providing an input WDM optical signal on at least first and second output paths;
    an optical amplifier for amplifying the WDM optical signal in at least one of the paths;
    a signal routing arrangement for routing individual channels or groups of channels of the WDM signal within the at least one of the paths; and
    a switch for selecting the signal from one of the at least first and second output paths.

2. An arrangement as claimed in claim 1, wherein the switching arrangement comprises at least one wavelength—selective tap for tapping a selected wavelength channel from the WDM signal.

3. An arrangement as claimed in claim 1, wherein the switching arrangement comprises a multiple input and multiple output switching core for routing individual channels of the WDM signal.

4. An arrangement as claimed in claim 3, wherein a switching core is provided in each of the first and second output paths, and each switching core is provided with a wavelength division de-multiplexer at the input of the core for dividing the WDM signal into individual channels or groups of channels.

5. An arrangement as claimed in claim 4, wherein the outputs of the switching cores are provided to the switch, a wavelength division multiplexer being provided at the output of the switch.

6. An arrangement as claimed in claim 5, wherein the switch comprises a switch array to enable individual channels or groups of channels from each path to be switched to the output of the switch.

7. An arrangement as claimed in claim 4, wherein each switching core is provided with a wavelength division multiplexer at the output of the core for combining the WDM channels into an individual WDM signal, and wherein the individual WDM signals from the two switching cores are provided to the switch.

8. An arrangement as claimed in claim 4, wherein each switching core is provided with a wavelength division multiplexer at the output of the core for combining the WDM channels into an individual WDM signal, and wherein a further amplifier is provided in each path for amplifying the individual WDM signals, the amplified individual WDM signals being provided to the switch.

9. An arrangement as claimed in claim 1, wherein the splitter comprises a two way splitter.

10. An arrangement as claimed in claim 1, wherein the splitter comprises a one by two optical switch.

11. An arrangement as claimed in claim 1, wherein the switch comprises a two-input optical switch.

12. An arrangement as claimed in claim 11, wherein the switch comprises a two-input two-output optical switch.

13. An arrangement as claimed in claim 1, wherein the output of the switch is further amplified before defining the output of the amplifier arrangement.

14. An optical amplifier arrangement comprising;
    an amplifier section, comprising:

a splitter for providing an input WDM optical signal on at least first and second output paths; and
an optical amplifier for amplifying the WDM optical signal in at least one of the paths; and
a switching core section at the output of the amplifier section, comprising:
a de-multiplexer for dividing an amplified WDM signal into individual channels or groups of channels;
a splitter for providing the divided channels on at least third and fourth output paths;
an optical switching core in each of the third and fourth paths; and
a switch for selecting the output of one of the switching cores.

15. An arrangement as claimed in claim 14, wherein a wavelength division multiplexer is provided at the output of the switch.

16. An optical communications system comprising a plurality of nodes connected by optical transmission lines, wherein at least one node is provided with an optical amplifier arrangement according to claim 1.

17. A method of upgrading an optical amplifier arrangement, comprising:

defining a first path between an input and an output of the amplifier arrangement, the first path including a splitter;

amplifying the signal in the first path using a first amplifier positioned downstream of the splitter and routing the amplified signal from the first path towards the output;

defining a second path between the input and the output of the amplifier arrangement, the second path including said splitter;

providing an amplifier and a channel routing device in the second path downstream of said splitter; and routing the amplified signal from the second path towards the output.

18. A method as claimed in claim 17, further comprising upgrading the amplifier and providing or upgrading a channel routing device in the first path downstream of said splitter.

19. A method as claimed in claim 17, wherein the output signal is provided from the first or second path by a switch.

* * * * *